US007941235B2

(12) United States Patent
Yoneda et al.

(10) Patent No.: US 7,941,235 B2
(45) Date of Patent: May 10, 2011

(54) PLAYBACK APPARATUS, PLAYBACK METHOD, PLAYBACK SYSTEM AND RECORDING MEDIUM

(75) Inventors: Michiaki Yoneda, Kanagawa (JP); Shigetaka Kudo, Kanagawa (JP); Takashi Koya, Kanagawa (JP); Taketeru Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 949 days.

(21) Appl. No.: 11/827,155

(22) Filed: Jul. 11, 2007

(65) Prior Publication Data

US 2008/0049947 A1 Feb. 28, 2008

(30) Foreign Application Priority Data

Jul. 14, 2006 (JP) ................................ 2006-194939

(51) Int. Cl.
*G06F 17/00* (2006.01)

(52) U.S. Cl. ........................................................ 700/94

(58) Field of Classification Search .................... 700/94; 709/205, 235, 228–229, 238, 250, 237, 200; 710/20, 52, 118; 370/230, 235; 375/240
See application file for complete search history.

(56) References Cited

U.S. PATENT DOCUMENTS

| | | | |
|---|---|---|---|
| 6,985,069 | B2 | 1/2006 | Marmaropoulos |
| 2002/0188747 | A1 | 12/2002 | Takeuchi et al. |

FOREIGN PATENT DOCUMENTS

| | | | |
|---|---|---|---|
| EP | 1343295 | A2 | 9/2003 |
| JP | 10-063458 | | 3/1998 |
| JP | 10-285594 | | 10/1998 |
| JP | 10-322691 | | 12/1998 |
| JP | 11-306737 | | 11/1999 |
| JP | 2002-164886 | | 6/2002 |
| JP | 2002-217990 | | 8/2002 |
| JP | 2002-368634 | | 12/2002 |
| JP | 2003-058192 | | 2/2003 |
| JP | 2003-255959 | A | 9/2003 |
| JP | 2003-331524 | | 11/2003 |
| JP | 2004-093729 | | 3/2004 |
| JP | 2004-515949 | | 5/2004 |
| JP | 2004-318961 | | 11/2004 |
| JP | 2004-333674 | | 11/2004 |
| JP | 2005-122034 | | 5/2005 |
| JP | 2006-030577 | | 2/2006 |
| JP | 2006-031394 | | 2/2006 |

*Primary Examiner* — Andrew C Flanders
(74) *Attorney, Agent, or Firm* — Wolf, Greenfield & Sacks, P.C.

(57) ABSTRACT

In a playback apparatus, when a transmission finished notification for kth decompressed digital data is received via a communication portion, a control portion detects a silence start position in the kth decompressed digital data that is stored in the first buffer, transfers a section of the kth decompressed digital data that is before the silence start position to the second buffer, temporarily stores (k+1)th decompressed digital data that is received via the communication portion in the first buffer following the transfer of the section of the kth decompressed digital data, detects a silence end position in the (k+1)th decompressed digital data that is stored in the first buffer, and transfers a section of the (k+1)th decompressed digital data that is after the silence end position to the second buffer.

30 Claims, 7 Drawing Sheets

PLAYBACK APPARATUS, PLAYBACK METHOD, PLAYBACK SYSTEM AND RECORDING MEDIUM

CROSS REFERENCES TO RELATED APPLICATIONS

The present invention contains subject matter related to Japanese Patent Application JP 2006-194939 filed in the Japan Patent Office on Jul. 14, 2006, the entire contents of which being incorporated herein by reference.

BACKGROUND OF THE INVENTION

1. Field of the Invention

The present invention relates to a playback apparatus, a playback method, a playback system and a recording medium for a program, and in particular relates to a playback apparatus, a playback method a playback system and a recording medium for a program that favorably remove silent sections between a plurality of decompressed digital data to allow the data to be played back without breaks in the sound.

2. Description of the Related Art

Content distribution systems are known in which, for example, sound/image contents are transmitted/received via a network between a client and a server provided with a communication function using TCP/IP. In such a content distribution system, the client requests transmission of a list of content and services that are provided by the server. Then, the content distribution system requests transmission of the content selected by a user based on the list received from the server, and in response to this request, the server transmits the contents, which are received and then played back by the content distribution system.

At this time, the client temporarily and sequentially stores the received content data in a buffer (buffering). When a determined volume of content data has been stored, the client starts playback. Note that, if the client is only capable of processing decompressed digital data such as, for example, linear PCM data or the like, the server decodes the compressed digital data that has been compression encoded using, for example, MP3 (MPEG-1 Layer 3) format encoding, converts the data into linear PCM data, and transmits it to the client.

However, in the known server described above, if music content, containing all of the tracks of a live performance album, for example, is transmitted to the client from the server, it is necessary for each piece of music content to be continuously played back at the client side. Normally, in a live performance, sound is still generated during the interval between tracks, and thus when a music compact disk (CD) of a recorded live performance is played back, the sound during the interval between tracks is also played back. However, in the known server, data that has been encoded using track units is generated, and distributed as music content. As a result, even if it is possible to transmit music content containing each track of an album from the server to the client, and for each track to be continuously played back at the client side, a silent period is generated between neighboring played back tracks. Thus, as compared to replaying a music CD, it is unavoidable that the music will sound unnatural. The reason for this will be explained in more detail next.

In compression encoding formats like MP3, a determined number of sample data is selected as one frame, and then compression encoding is performed using this frame unit. Note that, when compression data from the first track, some sample data are left that will not fit into one frame at the end section of the track. Given this, normally, sample data with a value of zero (hereinafter referred to as "zero data") is added to form one frame, and then compression encoding is performed.

In the known server, compression encoding is performed using track units in this manner and then saved as music content. Accordingly, even if, hypothetically, encoded data for a plurality of track sections is continuously decoded and played back at the client side, the zero data is played back during the interval between tracks, thereby generating silent periods and breaks in the sound.

As one method of solving this problem, in the case of a live performance album, sample data for all the tracks on the album can be selected instead of track units, and then compression encoding can be performed on this group sample data. However, if this method is adopted, the server has to select all the tracks on the album and generate encoded data using compression encoding. As a result, when necessary data is transmitted to the client, it is not possible to replay just a specific track from the album or replay a specific track and the tracks following it.

In order to address the above-described problems, for example, Japanese Patent Application Publication No. JP-A-2006-30577 discloses a technology in which, when the server performs compression encoding on the music content, the start of the sample data of a second track is added to the end of the sample data of a first track to form one frame. Accordingly, the silent section between tracks is removed in advance at the server side, and then the music data is transmitted to the client.

Note that, Japanese Patent Application Publication No. JP-A-2004-318961 discloses a technology in which noise removal processing is performed on music content based on an analogue sound signal, and sections with a determined signal level or less are estimated to be the intervals between tracks. Then, the intervals between tracks are identified using information for identifying the intervals between tracks, whereby it is possible to accurately detect silent sections between the tracks included in the music content by suppressing the influence of noise.

SUMMARY OF THE INVENTION

However, in the technology disclosed in JP-A-2006-30577 described above, the silent section in the intervals between the tracks of the music content is removed at the server side. Accordingly, in the case that the client is connected to a server that does not have a silent section removal function, it is not possible to remove the silent section. As a result, if a plurality of tracks included in an album like a live album are continuously played back by the client, silent periods are generated in the intervals between the tracks, thereby causing breaks in the sound.

The present invention addresses the above-identified, and other problems associated with known apparatuses and methods, and provides a playback apparatus which functions as a client, and which allows a plurality of contents to be continuously played back without breaks in sound even when the playback apparatus is connected to a server that does not have a silent section removal function. The present invention also provides a playback method, a playback system and a recording medium.

According to an embodiment of the present invention, there is provided a playback apparatus including: a communication portion that receives decompressed digital data obtained by decoding compressed digital data that is compression encoded using a specified encoding unit; a first buffer that temporarily stores the decompressed digital data that is received by the communication portion; a second buffer that temporarily stores the decompressed digital data that is read from the first buffer; a D/A conversion portion that performs D/A conversion on the decompressed digital data that is read from the second buffer and outputs analogue data; and a control portion that controls transfer of the decompressed digital data from the first buffer to the second buffer. In this playback apparatus, when a transmission finished notification for kth decompressed digital data is received via the communication portion, the control portion detects a silence start position in the kth decompressed digital data that is stored in the first buffer, transfers a section of the kth decompressed digital data that is before the silence start position to the second buffer, receives (k+1)th decompressed digital data in addition the communication portion temporarily stores (k+1)th decompressed digital data that is received via the communication portion following the transfer of the section of the kth decompressed digital data to the second buffer, temporarily stores the (k+1)th decompressed digital data in the first buffer, detects a silence end position in the (k+1)th decompressed digital data that is stored in the first buffer, and transfers a section of the (k+1)th decompressed digital data that is after the silence end position to the second buffer.

According to the above described structure, in response to receiving the transmission finished notification for the kth decompressed digital data (here, K is any given integer number of 1 or more, e.g., k may equal 1, 2, 3 . . . ), the silence start position in the kth decompressed digital data stored in the first buffer is detected, the (k+1)th decompressed digital data is received, and the silence end position in the (k+1)th decompressed digital data is detected. As a result, it is possible not to transfer the silent section in the decompressed digital data between the silence start position and the silence end position to the second buffer. As a result, the playback apparatus is able to playback decompressed data that has had the silent section at the end section of the kth decompressed digital data, and the silent section at the head section of the (k+1)th decompressed digital data removed. Accordingly, no silent periods are generated, and the plurality of decompressed data can be continuously played back.

In addition, in the above playback apparatus, the communication portion may receive the decompressed digital data in accordance with TCP/IP. Moreover, when the control portion receives via the communication portion a control flag (FIN), as the transmission finished notification, that indicates that data transmission is finished in TCP/IP, the control portion may detect the silence start position in the kth decompressed digital data stored in the first buffer. If this structure is adopted, the TCP/IP control flag (FIN) can be used to accurately determine the end of the kth decompressed digital data, whereby it is possible to accurately and efficiently detect the silence start position and the silence end position.

Furthermore, the control portion may selectively activate and deactivate a silence position detection function that detects the silence start position and the silence end position. If this structure is adopted, the silence position detection function can be activated or deactivated in accordance with the type of content included in the decompressed digital data, whereby the content can be appropriately played back.

Moreover, the communication portion may receive, prior to receiving the decompressed digital data, attribute information that corresponds with the decompressed digital data, and the control portion may activate the silence position detection function when original codec information included in the attribute information for the decompressed digital data indicates a format other than PCM format. If this structure is adopted, if the decompressed digital data is data obtained by decoding compressed data (for example, MP3 data) that is compression encoded using compression codec, the silence position detection function can be activated. On the other hand, if the data is decompressed digital data that was not originally compressed (for example, linear PCM data), the silence position detection function can be deactivated. Accordingly, the silence position detection function is only used when necessary.

In addition, the communication portion may receive, prior to receiving the decompressed digital data, the attribute information that corresponds with the decompressed digital data, and the control portion may selectively set the silence position detection function to activate and deactivate for a group unit (for example, an album unit of music content) that includes a plurality of the decompressed digital data based on the attribute information. If this structure is adopted, when the playback apparatus plays back the decompressed digital data of content included in a group that needs silence position detection, the silence position detection function can be activated.

Moreover, a structure may be adopted in which the first buffer is capable of storing at least one unit of the specified encoding unit of decompressed digital data. Furthermore, in response to receipt of the transmission finished notification, the control portion may search sample data included in an end section of the kth decompressed digital data that is already stored in the first buffer at the time of receiving the transmission finished notification, and detect the silence start position. If this structure is adopted, the silence start position can be favorably detected.

Moreover, a structure may be adopted in which the first buffer is capable of storing at least one unit, which is one of the specified encoding unit, of the decompressed digital data. Moreover, when the control portion starts to receive the (k+1)th decompressed digital data, the control portion may search sample data included in a start section of the (k+1)th decompressed digital data that is stored in the first buffer, and detect the silence end position. If this structure is adopted, the silence end position can be favorably detected.

According to the embodiment of the present invention, there is provided a playback method including receiving decompressed digital data obtained by decoding compressed digital data that is compression encoded using a specified encoding unit, temporarily storing the received decompressed digital data in a first buffer, temporarily storing the decompressed digital data that is read from the first buffer in a second buffer, converting the decompressed digital data that is read from the second buffer to analogue data using a D/A conversion portion, and outputting the data. The playback method includes the steps of: receiving a transmission finished notification for kth decompressed digital data; detecting a silence start position in the kth decompressed digital data that is stored in the first buffer when the transmission finished notification is received, transferring a section of the kth decompressed digital data that is before the silence start position to the second buffer, receiving (k+1)th decompressed digital data via the communication portion after transferring the section of the kth decompressed digital data; temporarily storing the (k+1)th decompressed digital data in the first buffer; detecting a silence end position in the (k+1)th decompressed digital data that is stored in the first buffer, and transferring, from among the (k+1)th decompressed digital data, a section that is after the silence end position to the second buffer.

According to the embodiment of the present invention, there is provided a program including instructions that command a computer to execute the steps of: receiving decompressed digital data obtained by decoding compressed digital data that is compression encoded using a specified encoding unit, temporarily storing the received decompressed digital data in a first buffer, temporarily storing the decompressed digital data that is read from the first buffer in a second buffer, converting the decompressed digital data that is read from the second buffer to analogue data using a D/A conversion portion, and outputting the data. The program includes instructions that command the computer to execute the steps of: receiving a transmission finished notification for kth decompressed digital data; detecting a silence start position in the kth decompressed digital data that is stored in the first buffer when the transmission finished notification is received, transferring a section of the kth decompressed digital data that is before the silence start position to the second buffer, receiving (k+1)th decompressed digital data via a communication portion after transferring the section of the kth decompressed digital data; temporarily storing the (k+1)th decompressed digital data in the first buffer; detecting a silence end position in the (k+1)th decompressed digital data that is stored in the first buffer, and transferring, from among the (k+1)th decompressed digital data, a section that is after the silence end position to the second buffer.

According to the embodiment of the present invention, a plurality of contents can be continuously played back without breaks in sound even when a playback apparatus is connected to a server that does not have a silent section removal function.

DETAILED DESCRIPTION OF THE PREFERRED EMBODIMENTS

Figure 1:
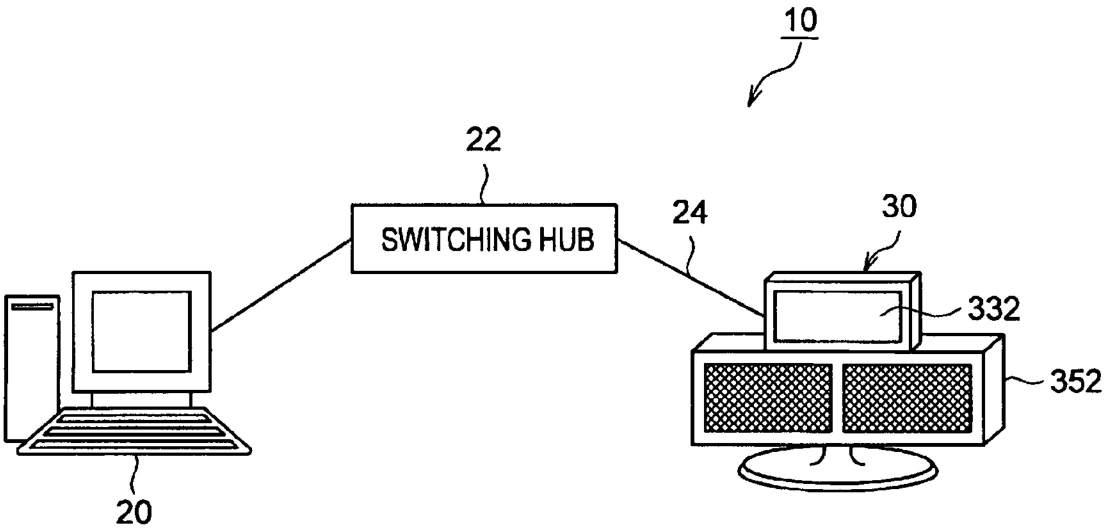
FIG. 1 is an explanatory figure that illustrates the structure of a content distribution system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, an overview of a content distribution system 10 that is an applied example of a playback apparatus according to a first embodiment of the present invention will be explained with reference to FIG. 1. FIG. 1 is an explanatory figure that illustrates the structure of the content distribution system 10 according to the embodiment.

As shown in FIG. 1, the content distribution system 10 is configured as a home network system installed, for example, inside a home of a user. The content distribution system 10 includes a home server 20, and a playback apparatus 30. The home server 20 transmits content data via an in-home network 24 (in-home local area network (LAN)) and a switching hub 22. The playback apparatus 30 receives and replays the content data that has been transmitted by the home server 20. The home server 20 is connected via the home network 24 to one, two or more client devices in the home network system, and functions as a server that distributes data. The playback apparatus 30 corresponds to a client device of the home server 20.

The content data (hereinafter referred to as "content") may be any chosen content such as, for example, audio content like music, a lecture, or a radio program, video content formed from image data and sound data, like a film, a television program, or a video program, or game content. The explanation given hereinafter will focus on an example in which the content is audio content, and more specifically is music content that has been ripped from a music CD. However, the present invention is not limited to this example.

The home server 20 is a Digital Media Server (DMS) that can record, store and distribute content. The home server 20 is, for example, a DLNA compatible device that transmits/receives data in conformance with Digital Living Network Alliance (DLNA) guidelines. The home server 20 may be structured by a personal computer (PC), or alternatively by various different types of information processing device such as a server device for a home network, a data recorder (a DVD/HDD recorder or the like), a game console, or a home information appliance.

The home server 20 obtains and stores a plurality of music content. For example, the home server 20 may receive content that is distributed from a content distribution server (not shown) that supplies a content distribution service via a public circuit network (not shown) such as the internet or LAN. The home server 20 stores the distributed content on a storage device like a Hard Disk Drive (HDD) or the like. In addition, the home server 20 can be used to create new content using self-recording (using the home server 20 itself to record music or images etc.) or ripping, and then save the new content in a storage device or a removable storage medium. Note that, self-recording involves using an imaging device/sound collector that are provided as accessories to the home server 20 to film/collect images and sound which are then recorded as digital data. Furthermore, ripping involves extracting digital content (sound content/film data etc.) that is recorded on a storage medium like a music CD, a video DVD or the like, converting the digital content to a file format that can be processed by a computer, and then storing the content in a storage device, a removable storage medium or the like.

The content that has been saved on the home server 20 in the above-described manner may be, for example, decompressed digital data (hereinafter referred to as "decompressed data") such as linear Pulse Code Modulation (PCM) data or the like. Alternatively, compressed digital data (hereinafter referred to as "compressed data") that has been compressed using one of various types of compression encoding format. For the compression encoding format, it is possible to use, in the case of music content, Adaptive Transform Acoustic Coding (ATRAC), ATRAC3, MPEG Audio Layer 3 (MP3), Advanced Audio Coding (AAC), Windows Media Audio (WMA) or the like.

The home server 20 receives a content transmission request from the playback apparatus 30, and transmits the requested content using a streaming method (hereinafter referred to as "streaming transmission") to the playback apparatus 30 via the home network 24. Note that, the streaming method is a method in which data is transmitted in synchronization with the processing speed (for example, the playback speed) of the content of the device on the data receiving side (the playback apparatus 30). As a result, the playback apparatus 30 replays the content received by streaming transmission from the home server 20 at the same time as the content is received. In addition, in the case that the content is compressed data, the home server 20 decodes the compressed data, converts it to the original decompressed digital data (for example, linear PCM data) and transmits the data to the playback apparatus 30.

The playback apparatus 30 is a digital media player (DMP) that can replay content. The playback apparatus 30 is also, for example, a DLNA compatible device that transmits/receives data in conformance with DLNA guidelines, like the home server 20. The playback apparatus 30 may be structured by, for example, a notebook style personal computer (PC), a portable music player, an audio-visual (AV) component, a personal digital assistant (PDA), a household game console, a mobile game machine, a mobile phone, a PHS, a data playback apparatus (a DVD/HDD player or the like), or a home information appliance like a television or the like. The playback apparatus 30 is provided with a display portion 332 (an LCD panel or the like) that functions as an interface with the user. In addition, the playback apparatus 30 has an externally attached audio output portion, for example, a speaker 352, which outputs the replayed music content as sound.

The switching hub 22 is a router that is used when data is transmitted/received via the home network 24 between the home server 20 and the playback apparatus 30. The switching hub 22 is structured by an Ethernet switch or the like. The switching hub 22 functions as a bridge, and analyses data that is received from a transmission source terminal, identifies the destination of the data, and then transmits the data to just the transmission destination terminal. As a result, the overall load of the home network system can be reduced, and security improved.

The home network 24 is a communication network that is connected to, for example, a plurality of devices (the home server 20, the playback apparatus 30) that are used within the home. The home network 24 may be wired or wireless, and may be formed using an Ethernet (registered trademark) that uses a wired connection such as, for example, 10 base2, or 1000 baseT, or alternatively, may be formed using a wireless LAN that conforms to the Institute of Electrical and Electronics Engineer, Inc. (IEEE) 802.11 group standard. Note that, the network is not limited to the example of the home network 24.

As described above, both the home server 20 and the playback apparatus 30 of the present embodiment are, for example, DLNA compatible devices. The home server 20 and the playback apparatus 30 transmit and receive data between each other using Transmission Control Protocol/Internet Protocol (TCP/IP) as the communications protocol, via the home network 24 that uses the Ethernet (registered trademark) and/or a wireless LAN. The home server 20 and the playback apparatus 30 can be used simply by connecting them to the home network 24. The playback apparatus 30 (DMP) searches for the home server 20 (DMS) that exists within the home network system, and automatically obtains a content list of available content from the home server 20. The user simply needs to use the playback apparatus 30 to select the tracks in the pre-prepared content list that he/she wishes to listen to, whereby the content is automatically provided to the playback apparatus 30 from the home server 20 and replayed.

Next, the structure of the home server 20 and the playback apparatus 30 that configure the content distribution system 10 will be explained in more detail.

First, the structure of the home server 20 according to the present embodiment will be explained with reference to FIG. 2. Note that, FIG. 2 is a block diagram that shows the structure of the home server 20 according to the present embodiment.

Figure 2:
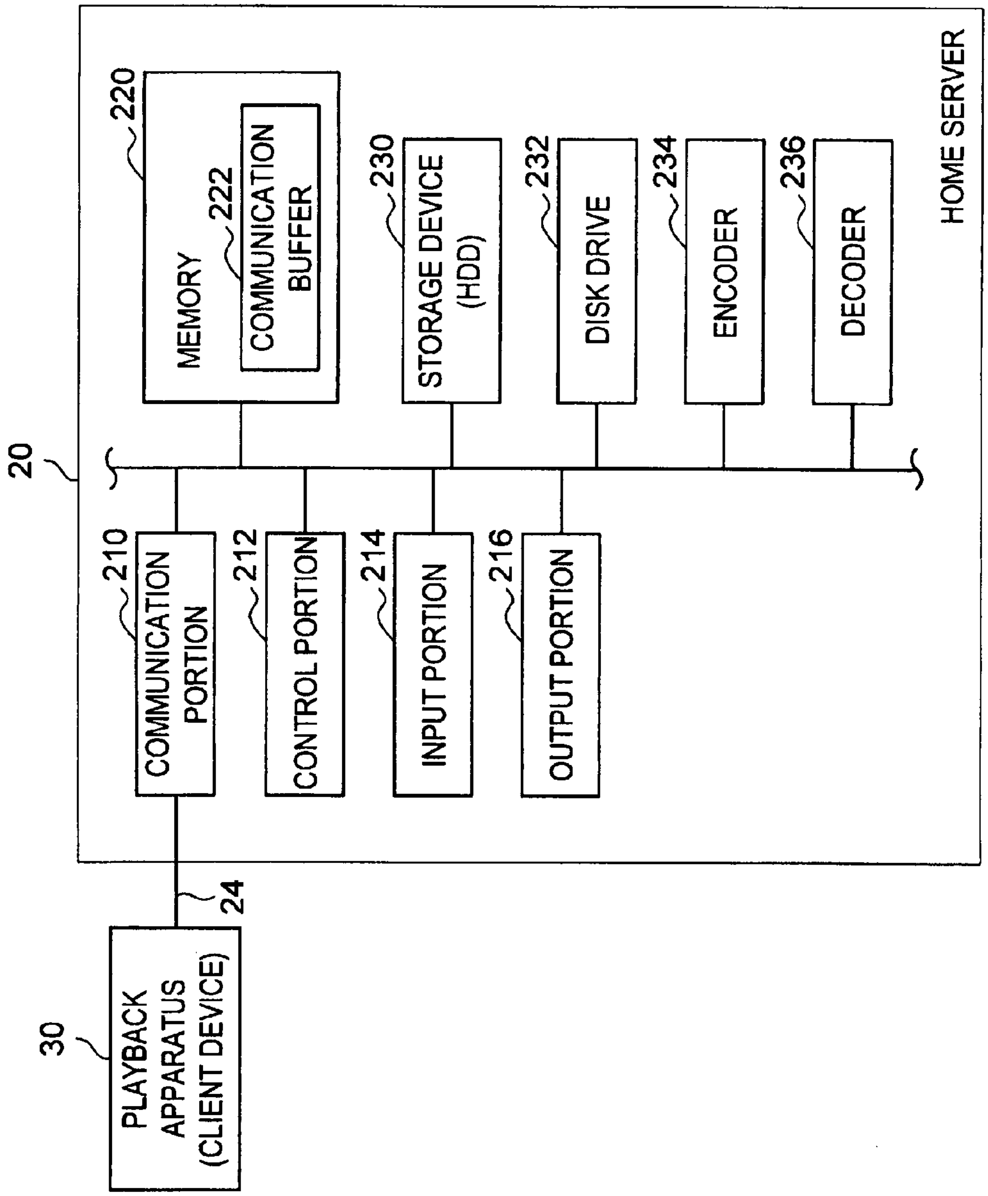
FIG. 2 is a block diagram that shows the structure of a home server according to the first embodiment.

Referring to FIG. 2, the home server 20 includes a communication portion 210, a control portion 212, an input portion 214, an output portion 216, a memory 220 that has a communication buffer 222, a storage device 230, a disk drive 232, an encoder 234, and a decoder 236.

The communication portion 210 transmits and receives various types of information, such as decompressed data of the content, content lists, and attribute information for the content, that are stored on the home server 20, between the home server 20 and the playback apparatus 30 via the home network 24. In addition, the communication portion 210 transmits and receives various types of information such as compressed data for the content, content distribution requests and the like between the home server 20 and the content distribution server (not shown) via the public circuit network (not shown). The communication portion 210 can use the communication buffer 222 when transmitting and receiving the various types of information.

The control portion 212 is structured by, for example, a central processing unit (CPU), a ROM, a RAM, etc. The control portion 212 operates in accordance with various programs stored in the ROM and the storage device 230, and performs overall control of the operation of the home server 20. For example, the control portion 212 controls the transmission/receipt of the various types of data with the playback apparatus 30 via the communication portion 210. More specifically, the control portion 212 controls streaming transmission in which compressed data of the content that is being read from the storage device 230 is converted to decompressed data and transmitted to the playback apparatus 30. The streaming transmission will be explained in more detail later. In addition, the control portion 212 functions as a ripping portion, and uses the disk drive 232 and the encoder 234 to rip music content (tracks) or image content from a music CD, a video DVD or the like that is loaded in the disk drive 232. The ripped content is then saved in the storage device 230.

The input portion 214 includes an operation unit like, for example, a mouse, a keyboard, a touch panel, a button, a switch, or a lever, and an input control circuit that generates an input signal and outputs the input signal to the control portion 212. The user of the home server 20 can operate the input portion 214 to input various types of data to the home server 20 and instruct the home server 20 to perform processing operations.

The output portion 216 includes a display device and a audio output device. The display device may be, for example, a Cathode Ray Tube (CRT) display device, a liquid crystal display (LCD) device, a lamp or the like, and the audio output device is a speaker or the like. The content played back by the home server 20 is displayed/output as sound using the output portion 216.

The memory 220 includes, for example, a static random access memory (SRAM), a dynamic random access memory (DRAM), a synchronous DRAM (SDRAM) or a Rambus DRAM (RDRAM), and temporarily stores (buffers) the various types of data. The memory 220 functions as a communication buffer 222 that smoothly transmits/receives data when the home server 20 and the playback apparatus 30 are communicating. Note that, the memory 220 is also capable of functioning as a receiving buffer (not shown) that temporarily stores compressed data of content that has been distributed from the content distribution server in order to stably transfer the compressed data to the decoder 236.

The storage device 230 is a data storage device, and is structured by, for example, a hard disk drive (HDD). The storage device 230 controls a hard disk, and stores various types of data such as programs for operating the control portion 212, and compressed data of ripped content or distributed content.

Note that, the storage device 230 according to the present embodiment uses a hard disk as a storage medium. However, the invention is not limited to this structure, and, for example, the storage medium may be a non-volatile semiconductor memory like an electrically erasable programmable read-only memory (EEPROM), or an erasable programmable read-only memory (EPROM); a magnetic disk like a flexible disk; an optical disk like a compact disk recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE); or a magneto optical disk like a magneto optical (MO) disk. In addition, the storage medium may be a removable storage medium that can be attached to and removed from the home server 20.

The disk drive 232 is one example of a recording and playback apparatus for use with the removable storage medium, and is built-in or externally attached to the home server 20. The disk drive 232 records and playbacks various types of data such as content using the removable storage medium that is, for example, a loaded magnetic disk, optical disk, or magneto optical disk, or a semiconductor memory or the like. Providing the disk drive 232 allows music CDs or video DVDs to be loaded into the home server 20 so that the music content recorded on the given music CD or the video content recorded on the given video DVD to be ripped.

The encoder 234 compression encodes the image/sound digital data using a determined compression encoding format (for example, MP3, ACC, ATRAC, ATRAC3 or the like) when ripping or self-recording is performed. Then, the encoder 234 generates compressed data for the music content or the video content etc. At this time, the encoder 234 compression encodes the content using a determined encoding unit, for example, frame units. More specifically, when compression encoding is performed, the control portion 212 extracts each determined number n sample from the sample data string of the music content (track) that is to be compression encoded (for example, each 1152 sample), and selects it as one frame. The control portion 212 outputs each frame to the encoder 234. Then, the compressed frame obtained from the encoder 234 (for example, an MP3 frame) is recorded in the storage device 230 as compressed data of the music content.

The decoder 236 decodes (expands) the compressed data of the music content etc. that is read from the storage device 230, and converts it to decompressed data (for example, linear PCM data). Then, the control portion 212 performs control to temporarily store the generated decompressed data in the communication buffer 222, and then transferred it to the playback apparatus 30.

Figure 3:
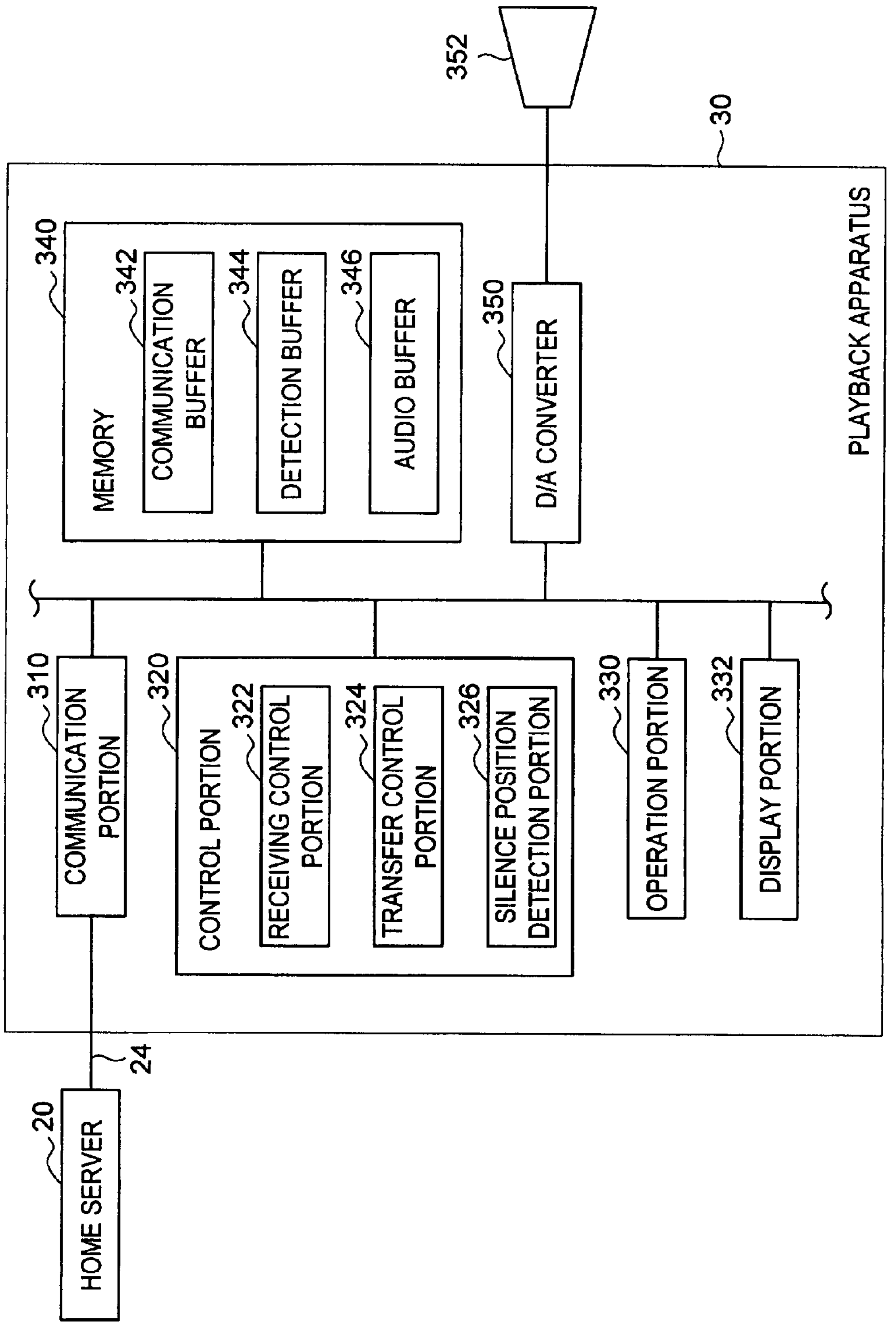
FIG. 3 is a block diagram that shows the structure of a playback apparatus according to the first embodiment.

Next, the structure of the playback apparatus 30 according to the present embodiment will be explained with reference to FIG. 3. FIG. 3 is a block diagram showing the structure of the playback apparatus 30 according to the present embodiment.

Referring to FIG. 3, the playback apparatus 30 includes a communication portion 310, a control portion 320, an operation portion 330, a display portion 332, a memory 340 provided with a communication buffer 342, a detection buffer (first buffer) 344 and an audio buffer (second buffer) 346, and a D/A converter 350. Note that, in the present embodiment, a speaker 352, which is an audio output portion, is externally attached to the playback apparatus 30. However, the invention is not limited to this structure, and an audio output device like a speaker may be built-in to the playback apparatus 30.

The communication portion 310 transmits and receives various types of information between the playback apparatus 30 and the home server 20 via the home network 24. For example, the communication portion 310 may receive content lists that display the content that can be supplied by the home server 20, or attribute information for the content from the home server 20. Moreover, the communication portion 310 may request that the home server 20 transmits content on the content list that is wanted by a user, and receive decompressed data that is decoded from compressed data of the content. The communication portion 310 can use the communication buffer 342 when transmitting and receiving the content lists, the decompressed data of the content, and the attribute information for the content.

The control portion 320 is structured by, for example, a central processing unit (CPU), a ROM, a RAM, etc. The control portion 320 operates in accordance with various programs stored in the ROM etc., and performs overall control of the operation of the playback apparatus 30. More specifically, the control portion 320 functions as a receiving control portion 322 that controls the receipt of decompressed data of the content from the home server 20 via the communication portion 310. In addition, the control portion 320 also functions as a transfer control portion 324. The transfer control portion 324 controls streaming-replay that includes transferring decompressed data from the communication buffer 342 to the detection buffer 344, transferring decompressed data from the detection buffer 344 to the audio buffer 346, and transferring decompressed data from the audio buffer 346 to the D/A converter 350. In addition, the control portion 320 also functions as a silence position detection portion 326 that performs silence position detection using the detection buffer 344. Note that, the streaming-replay and the silence detection will be explained in more detail later.

The operation portion 330 includes an operation device and an input control circuit. The operation device is, for example, a touch panel, a button, a switch, a lever, a dial, a remote controller and a receiving portion for receiving an infrared signal generated by the remote controller, or the like. The input control circuit generates an operation signal in accordance with the operation that the user performs on the operation device, and outputs the operation signal to the control portion 320. The user of the playback apparatus 30 can operate the operation portion 330 to input various types of data to the playback apparatus 30 and instruct the playback apparatus 30 to perform processing operations. The user may perform various types of operation using the operation portion 330, including, for example, selecting content from a content list, playing back/pausing/fast forwarding/rewinding/adjusting the sound volume of the content or the like, or selecting activating/de-activating a silence position detection function (more specifically, a function that removes silent sections between a plurality of tracks), described hereinafter.

The display portion 332 includes a display device like, for example, a liquid crystal display (LCD) device. The display portion 332 displays the content list, the attribute information for the content list etc. that are received from the home server 20. The user can use the display of the content list to select desired content data. The display portion 332 may display whether the silence position detection function, described hereinafter, is ON/OFF or the like.

The memory 340 includes the communication buffer 342 that is used to smoothly transmit and receive data to/from the home server 20, the detection buffer 344 that detects the silence position, and the audio buffer 346 that stably transfers the decompressed data to the D/A converter 350. The memory 340 includes, for example, an SRAM, a DRAM, an SDRAM, an RDRAM or the like, and temporarily stores (buffers) the various types of data. The memory 340 functions as the communication buffer 342, the detection buffer 344 and the audio buffer 346.

The communication buffer 342 is a buffer for temporarily storing data so that data is smoothly transmitted/received when the home server 20 and the playback apparatus 30 are communicating.

The detection buffer 344 includes, for example, a ring buffer, and is one example of the first buffer for temporarily storing decompressed data received from the home server 20 via the communication portion 310. The detection buffer 344 is a buffer that, when streaming transmission of decompressed data for a plurality of music content (tracks) is being continuously performed, temporarily stores, at the least, the first frame or more of the most recently received decompressed data in order to remove the silent sections between the plurality of decompressed data (the silent sections between the tracks). The decompressed data that is temporarily stored in the detection buffer 344 is read by the transfer control portion 324 of the control portion 320, and transferred to the audio buffer 346. As a result of providing the detection buffer 344, it is possible to achieve the silent section removal function and the silence position detection function related to the silent section between the contents that are performed by the silence position detection portion 326, as will be described hereinafter.

The audio buffer 346 is one example of the second buffer that temporarily stores decompressed data that is read from the detection buffer 344 that functions as the first buffer. The audio buffer 346 includes, for example, a ring buffer. The decompressed data that is temporarily stored in the audio buffer 346 is read by the transfer control portion 324 of the control portion 320 and then transferred to the D/A converter 350.

Note that, in this embodiment, the communication buffer 342, the detection buffer 344 and the audio buffer 346 are physically provided in the same memory 340. However, the invention is not limited to this structure, and the respective members may be physically provided in a plurality of different memories. In addition, each buffer in the memory may be physically divided or theoretically divided.

The D/A converter 350 is one example of a D/A converter that performs digital/analogue conversion (D/A conversion) of the decompressed data read from the audio buffer 346 that functions as the second buffer. The D/A converter 350 coverts the decompressed data that is transferred from the audio buffer 346 to analogue format from digital format, namely, performs D/A conversion, and then outputs an analogue format playback signal to the speaker 352. For example, the D/A converter 350 may convert linear PCM decompressed data to an analogue format playback signal using a current-summing method. Then, the generated playback signal that has been converted to analogue format is output to the speaker 352 that is one example of the audio output portion. The speaker 352 then outputs sound. Note that, the D/A converter may be configured using hardware as in the case of the above-described D/A converter 350, or may be configured using software. However, the audio output portion is not limited to the example of the speaker 352, and may be a headset, earphones or the like.

Hereinabove, the content distribution system 10 according to the present embodiment, and the structure of the home server 20 and the playback apparatus 30 that are structural elements thereof have been explained with reference to FIG. 1 to FIG. 3. Next, the operation of the content distribution system 10 of the above-described structure will be explained.

When the contents stored in the home server 20 are played back using the playback apparatus 30, first, the playback apparatus 30 requests a content list from the home server 20 in accordance with the input of the user. In response to the transmission request, the home server 20 transmits the content list, which is a list of the content that can be distributed, to the playback apparatus 30. Then, the playback apparatus 30 displays the content list received from the home server 20 on the display portion 332. Next, the user selects content from the content list that he/she wants to listen to, and the playback apparatus 30 sends a transmission request for the selected content to the home server 20. In accordance with this transmission request, the home server 20 decodes the compressed data of the content, converts the data into a format of decompressed data that can be processed by the playback apparatus 30 (for example, linear PCM data), and then stream transmits the decompressed data to the playback apparatus 30. Then, the playback apparatus 30 plays back the decompressed data that is received by streaming transmission while receiving the decompressed data. In this playback process, the playback apparatus 30 temporarily stores the received decompressed data in the above-described buffers, D/A coverts the decompressed data read from the relevant buffer, generates the analogue format playback signal, and uses the speaker 352 to output sound.

In the above-described manner, in the present embodiment, the compressed data of the content stored in the home server 20 is decoded to decompressed data using the decoder 236 of the home server 20. Accordingly, the content can be decoded with a high degree of accuracy. In addition, because it is simply possible for the playback apparatus 30 to D/A covert the decompressed data decoded by the home server 20, and output the analogue data, there is no need to provide a decoder or the like for decoding the compressed data. As a result, manufacturing costs are reduced.

Note that, in the content distribution system 10, there are times when the user selects a group including a plurality of contents, for example, a music album (namely, a group including a plurality of pieces of music content (tracks)) as the content that is to be played back. In this case, the home server 20 successively stream transmits the decompressed data of the plurality of tracks included in the music album to the playback apparatus 30. Then, the playback apparatus 30 continuously writes the decompressed data received from the home server 20 into the buffers, reads the data from the relevant buffers, and performs D/A conversion to continuously playback the plurality of tracks.

Figure 4:
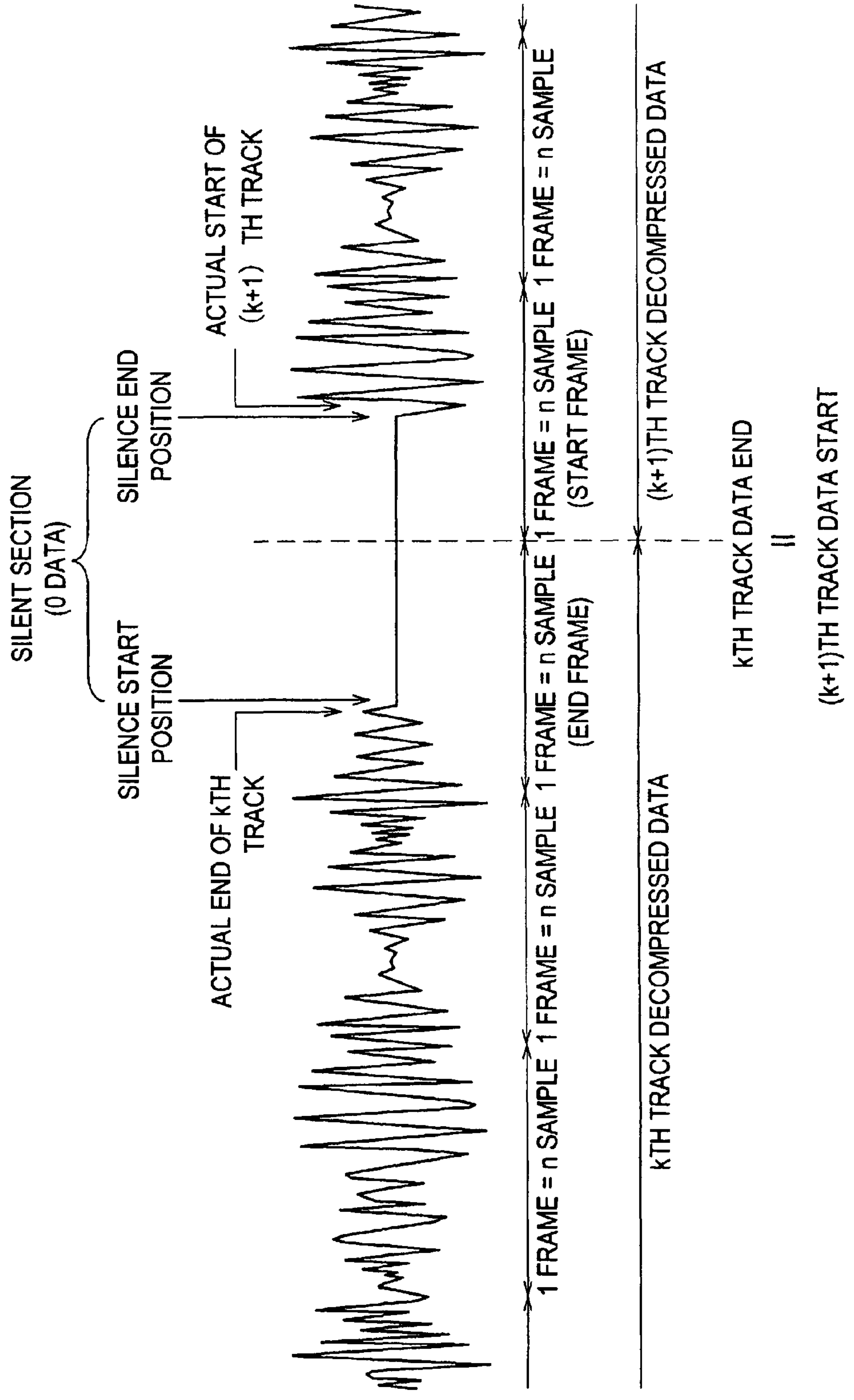
FIG. 4 is an explanatory figure that illustrates decompressed data before performance of silent section removal processing of the first embodiment.

In this case, if the group including the plurality of contents that is continuously played back by the playback apparatus 30 is a group in which sound is generated in the interval (the interval between tracks) between one music content and the next music content, such as in the case of a live performance album (hereinafter referred to as a "live album"), then, as in Japanese Patent Application Publication No. JP-A-2006-30577 described above, if the playback apparatus is connected to a server having a silent section removal function that removes the silent section of the plurality of intervals between tracks included in the live album etc., the content can be played back without breaks in the sound without any difficulty. However; if a server without a track interval silent section removal function, like the home server 20 according to the present embodiment, is connected to the playback apparatus 30, as shown in FIG. 4, decompressed data in which silent sections (0 data) exist in the intervals between the tracks of the live album is stream transmitted to the playback apparatus 30. As a result, the decompressed data is replayed without modification. Thus, instead of the decompressed data being played back as continuous tracks, breaks in the sound are generated with sudden silences being followed by sudden noise, which can be heard as replay noise.

The reason why the breaks in the sound occur is due to the method of compression encoding the content, as described above. More specifically, when music content (tracks) ripped from a music CD, for example, is compression encoded using MP3 or the like, a determined number n of sample data is selected as one frame, and the music content is compressed using frame units. At this time, if each single track of the music content (track) is compression encoded, there is insufficient sample data at the end frame that is at the tail section of the track. Accordingly, 0 data is added to the insufficient section to form one frame of data. As a result, it is unavoidable that a silent section is generated at the tail section of the track, after the section where the actual track ends. In addition, as a result of the inclusion of other data included in the music CD or the like, it is unavoidable that a silent section (0 data) is generated at the start section of the next track, before the start of the actual track. Accordingly, if each track is compressed to form compressed data and then decoded to form decompressed data which is played back in the above-described manner (for example, linear PCM data), silent sections will remain during the interval between tracks as shown in FIG. 4. These silent sections will cause breaks in the sound.

Figure 5:
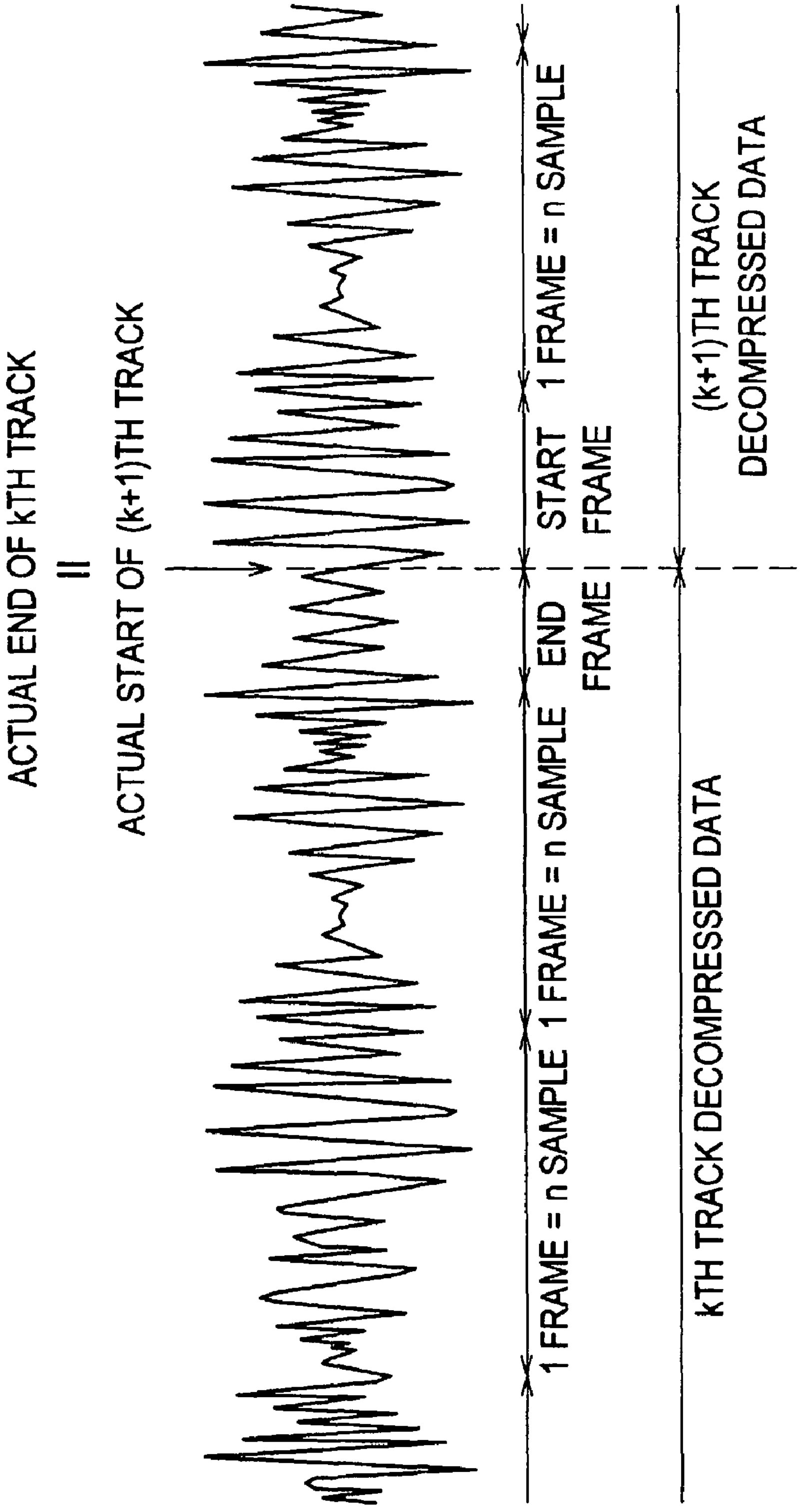
FIG. 5 is an explanatory figure that illustrates the decompressed data before and after the silent section removal processing of the first embodiment.

To address this problem, in the present embodiment, the unwanted silent section between the tail of the track and the start of the next track (from the silence start position to the silence end position shown in FIG. 4) that is generated by compression of the music content as shown in FIG. 4 is detected at the playback apparatus 30 side. As shown in FIG. 5, the silent section is removed so that the plurality of tracks included in the live album or the like have a continuous sound and can be continuously played back without breaks in the sound. Hereinafter, the silence position detection function and the silent section removal function will be explained in more detail.

First, an outline explanation will be given about the streaming transmission of the content and the processing operation used for streaming playback in the content distribution system 10 according to the present embodiment. Note that, FIG. 6 is an explanatory figure showing an outline of streaming transmission and streaming playback that are performed in the present embodiment.

Figure 6:
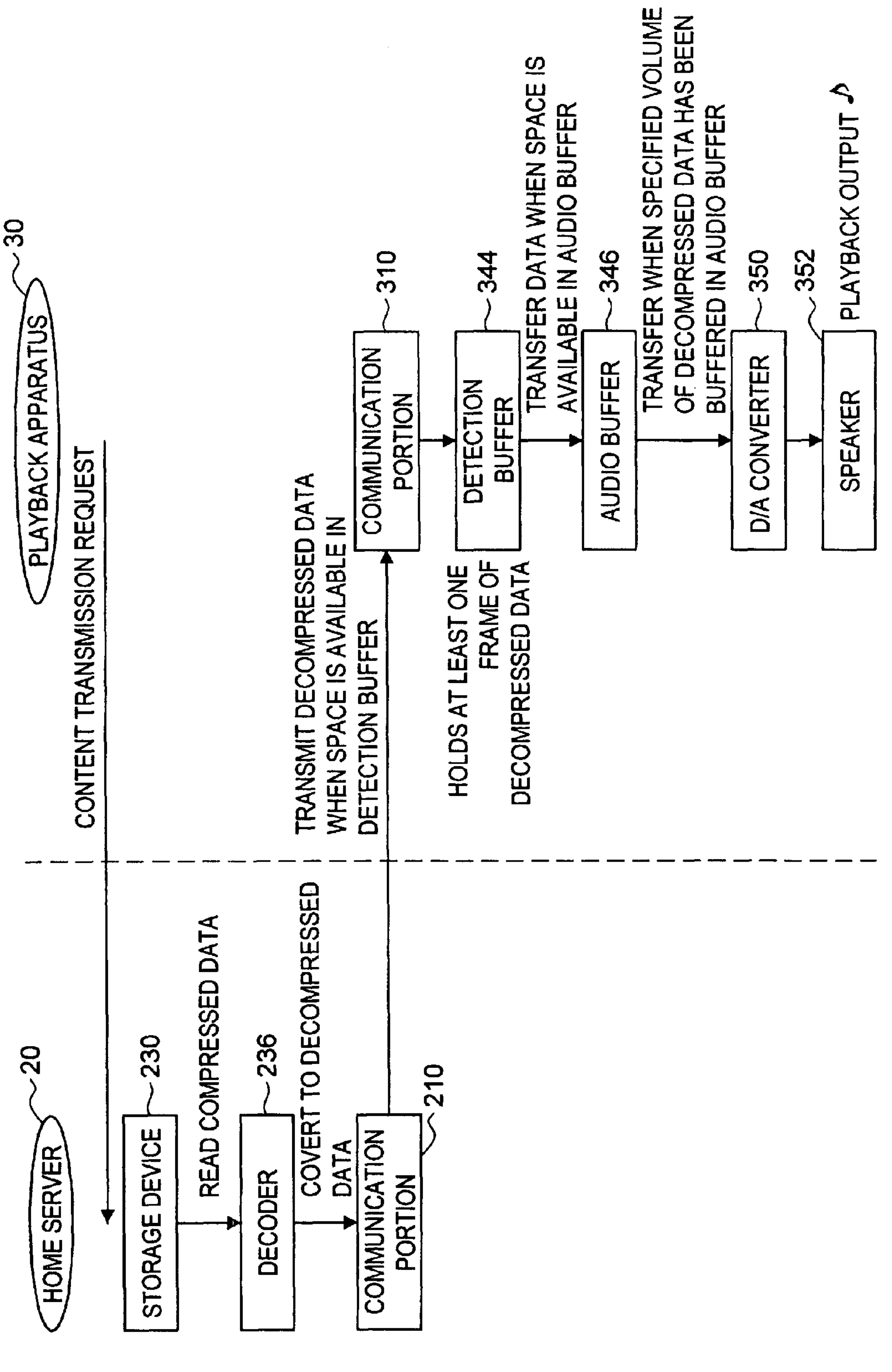
FIG. 6 is an explanatory figure that illustrates an outline of a streaming transmission process and a streaming playback process according to the first embodiment.

First, as shown in FIG. 6, the playback apparatus 30 transmits a content transmission request for the content selected by the user to the home server 20. This transmission request includes the specification of the address where the content is stored in the home server 20 (for example, a URL (Uniform Resource Locator). The control portion 212 of the home server 20 receives the content transmission request, and then successively reads the compressed data of the content, which is stored in the storage device 230, from the start of the compressed data (decompressed data may also be used). The control portion 212 then transmits the compressed data to the decoder 236. The decoder 236 then decodes the read compressed data to decompressed data (linear PCM data or the like). The output of the compressed data to the decoder 236 may be performed continuously or intermittently. Next, the home server 20 stream transmits the decoded decompressed data to the playback apparatus 30 via the communication portion 210 and the home network 24. Note that, in the present embodiment, the communications protocol between the home server 20 and the playback apparatus 30 may be based on data communication in accordance with, for example, TCP/IP. However, the invention is not limited to this, and for example, data communication may be performed in accordance with User Datagram Protocol/IP (UDP/IP).

When the playback apparatus 30 at the receiving side receives the decompressed data that is stream transmitted from the home server 20 via the communication portion 310, first, the decompressed data is temporarily stored in the detection buffer 344. Then, the decompressed data stored in the detection buffer 344 is read, and transferred to the audio buffer 346 where it is temporarily stored. The detection buffer 344 has a storage capacity that is sufficient to store at least one frame of decompressed data, and can hold at least one frame of the received decompressed data. As a result, the decompressed data that is received from the home server 20 is not immediately stored in the audio buffer 346, but is temporarily stored in the detection buffer 344. Accordingly, the decompressed data is stored in the audio buffer 346 with a delay of at least one frame from when the decompressed data is received. In this manner, the received decompressed data is buffered in two stages using two buffers, thereby making it possible to perform the silence position detection and the silent section removal described hereinafter.

In addition, the decompressed data stored in the audio buffer 346 in the above-described manner is transferred to the D/A converter 350, and converted to analogue data. The analogue format playback signal is then output to the speaker 352, which outputs sound. The series of processes of the playback apparatus 30 described above, namely, buffering, D/A conversion, and audio output, are referred to as streaming playback.

When streaming playback is being performed, the control portion 320 controls receiving of the decompressed data by the communication portion 310, transfer of the decompressed data to the audio buffer 346 from the detection buffer 344, and transfer of the decompressed data to the D/A converter 350 from the audio buffer 346 such that the music content or the like is continuously played back in a favorable manner.

More specifically, when the receiving of the decompressed data by the playback apparatus 30 starts, when the data volume of decompressed data stored in the audio buffer 346 reaches a data volume at which the D/A converter 350 can perform D/A conversion without any interruption in output, the transfer control portion 324 of the control portion 320 performs control such that the decompressed data is read from the audio buffer 346, and transferred to the D/A converter 350. As a result, in the initial state of the streaming playback, data is not transferred to the D/A converter 350 when there is insufficient decompressed data in the audio buffer 346 to allow the D/A conversion to output without interruption. Accordingly, it is possible to inhibit sound from being output with breaks in the sound.

Moreover, the transfer control portion 324 of the control portion 320 performs control such that, when space is available in the audio buffer 346 due to data being transferred to the D/A converter 350, decompressed data is read from the detection buffer 344 and transferred and written into the audio buffer 346. As a result, when there is no space available in the audio buffer 346, decompressed data is not transferred from the detection buffer 344 to the audio buffer 346 and the processing waits.

Furthermore, when space is available in the detection buffer 344 due to data being transferred to the audio buffer 346, the receiving control portion 322 of the control portion 320 sends a transmission request for the subsequent section of decompressed data to the home server 20 via the communication portion 310, receives the subsequent section of decompressed data, and buffers the decompressed data to the audio buffer 346. As a result, when there is no space available in the detection buffer 344, the playback apparatus 30 does not receive the decompressed data from the home server 20 and waits.

If the streaming transmission of the decompressed data from the home server 20 to the playback apparatus 30 is performed as described above, the decompressed data streaming playback of the playback apparatus 30 can be performed continuously. In addition, not only can just one track of content be played back independently, but a plurality of contents (a first track, a second track, . . . , an mth track) that are included in a music album or the like can be played back continuously. When a plurality of contents are continuously played back by streaming playback in this manner, it is necessary to inhibit the silent sections (see FIG. 4) that exist in between the tracks of the plurality of contents (the intervals between tracks) from causing breaks in the sound. To address this, in the present embodiment, the detection buffer 344 described above is additionally provided so that the silence position detection portion 326 of the control portion 320 can detect the silence start position and the silence end position (hereinafter also referred to as "silence position") of the intervals between the tracks, and remove the silent sections.

Next, the need for the detection buffer 344 that detects the silence position will be explained. The playback apparatus 30 obtains attribute information for the music content from the home server 20. More specifically, the music content is information about the length of the content (for example, performance time information given by the original codec, the data size, etc.). However, when the MP3 compressed data or the like is decoded at the home server 20 side, and linear PCM decompressed data or the like is transmitted to the playback apparatus 30, the frame timing in decoding can cause deviation between the actual decoded position and the original time information. As a result, the track performance time information and the like can become inaccurate and thus cannot be relied upon. Accordingly, it is not appropriate to use this inaccurate performance time information and the like as a basis for detecting the end position of each track of music content.

Note that, in the present embodiment, the detection buffer 344 is provided such that, when a transmission finished notification, (for example, a control flag "FIN" in TCP/IP) which indicates transmission of the decompressed data for each track is finished, is received from the home server 20, sample data of the already received decompressed data can be searched in just the previous section, namely, a silence detection section (for example, one frame), to detect the silence position.

Next, the silence position detection and the silent section removal that are performed using the detection buffer 344 will be explained.

As a result of providing the detection buffer 344 in the playback apparatus 30 as described above, the data of at least one frame of the decompressed data received from the home server 20 can be temporarily held in the detection buffer 344, without having to immediately transfer the data to the audio buffer 346. As a result, the silence position detection portion 326 of the control portion 320 can search the decompressed data of the at least one frame stored in the detection buffer 344 to detect the silence start position where the sample data value becomes zero in the end frame of the decompressed data, and to detect the silence end position that is immediately before the position where the sample data value becomes a value other than zero in the start frame of the decompressed data.

Next, a silence position detection method used by the silence position detection portion 326 will be explained in more detail. For example, if the decompressed data of the tracks is 2s complement 16-bit, 2 channel (L channel and R channel) data, the silence position detection portion 326 first converts each sample data value of the decompressed data to an absolute value. Then, the silence position detection portion 326 compares the absolute values with chosen threshold values (for example, 0x0200, 0x0080) to perform silence position detection. By performing level detection in this manner using sample data values that have been converted to absolute values and threshold values, even if calculation error causes the sample data values of the silent section not to be entirely zero data, the threshold values can be set appropriately to allow accurate detection of the silence start position and the silence end position.

More specifically, when the silence start position of the end section (end frame) of the decompressed data of the kth (k=1, 2, 3 . . . ) track is detected, the silence position detection portion 326 searches, in response to receipt of the transmission finished notification from the home server 20, the sample data of the end frame of the decompressed data that has been stored in the detection buffer 344 at the time of the receipt of the notification. As a result, when it is detected that the sample data values for the L and R channels are continuously below the threshold values for a determined sample number, the silence position detection portion 326 determines that the first position at which the sample data values are below the threshold values is the silence start position.

Furthermore, when the silence end position of the start section (start frame) of the decompressed data of the successively received (k+1)th track is detected, the silence position detection portion 326 detects the sample data of the start frame of the decompressed data stored in the detection buffer 344 when the decompressed data starts to be received. As a result, when it is detected that the sample data values for either one of the L and R channels is above the respective threshold value, the silence position detection portion 326 determines that a position just before the position at which either one of the sample data values is above the respective threshold value is the silence end position.

In this manner, the playback apparatus 30 uses the timing at which the transmission finished notification is received from the home server 20 as a basis for identifying the positions of the intervals between the tracks of the decompressed data of the plurality of tracks that are continuously transmitted, and then appropriately detects the silence start position and the silence end position that are at the front and rear of the position of each interval between tracks (refer to FIG. 4). In addition, the control portion 320 of the playback apparatus 30 transfers the sample data before the silence start position of the decompressed data of the kth track, and the sample data after the silence end position of the decompressed data of the (k+1)th track to the audio buffer 346, and does not transfer the sample data (zero data) of the silent section between the silence start position and the silence end position to the audio buffer 346. As a result, the sample data for the decompressed data that is stored in the audio buffer 346 is just sample data for the decompressed data with the silent sections of the intervals between tracks removed (refer to FIG. 5). Accordingly, when the decompressed data is read from the audio buffer 346, transferred to the D/A converter 350, and played back, it is possible to continuously play back the plurality of tracks without breaks in the sound.

Figure 7:
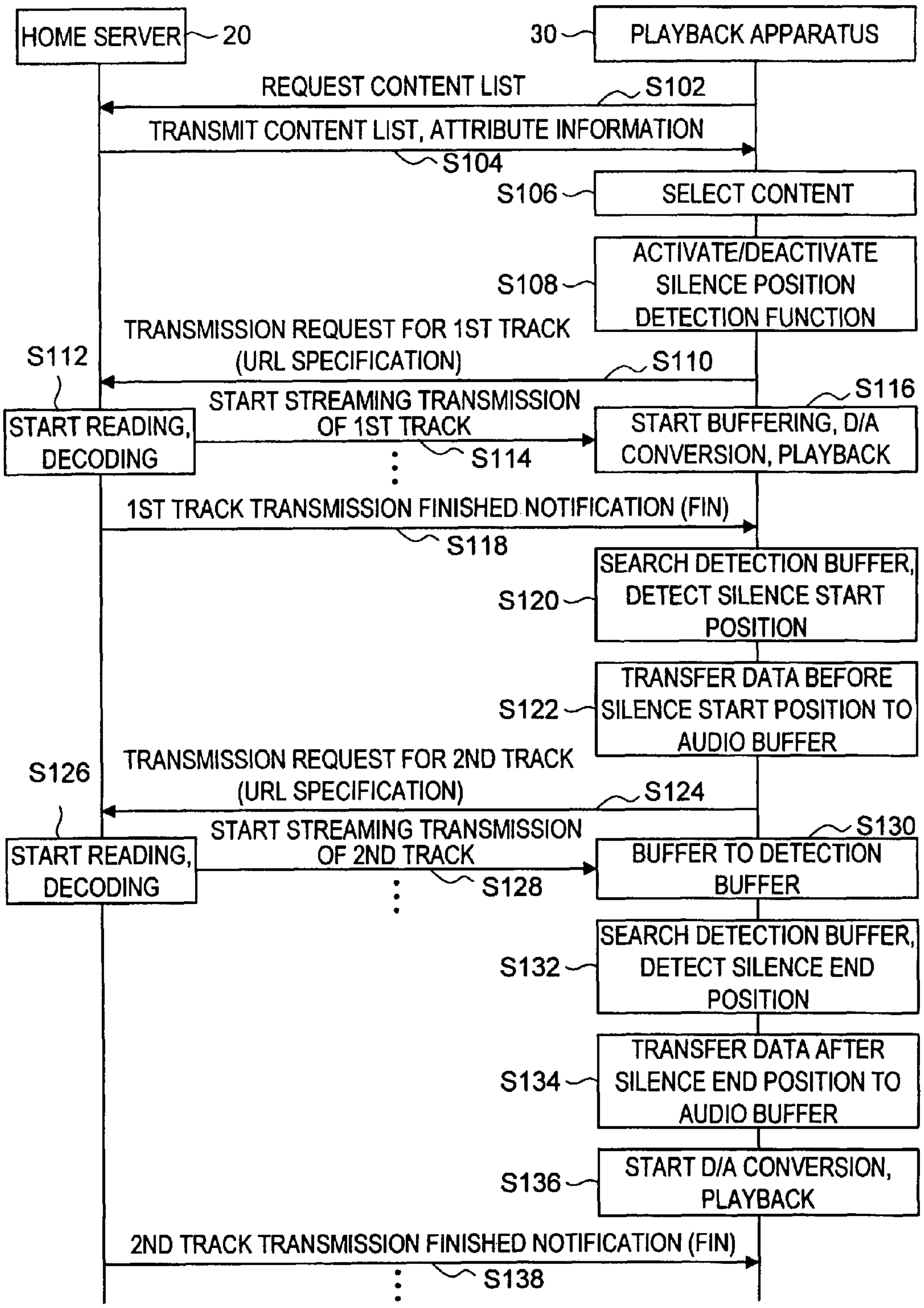
FIG. 7 is a sequence diagram showing a content playback method that is performed along with silence position detection and silent section removal according to the first embodiment.

Next, the content playback method that is used in conjunction with the silence position detection and the silent section removal of the home server 20 and the playback apparatus 30 according to the present embodiment will be explained with reference to FIG. 7. FIG. 7 is a sequence diagram showing the content playback method that is used in conjunction with silence position detection and silent section removal according to the present embodiment. Note that, FIG. 7 illustrates an example in which streaming transmission is used to continuously transmit a plurality of music contents (tracks) included in a single live album from the home server 20 to the playback apparatus 30.

As shown in FIG. 7, first, the playback apparatus 30 requests the home server 20 to transmit a content list that includes a list of a plurality of music contents that can be distributed from the home server 20 (step S102). In response to receiving the list transmission request, the home server 20 transmits the given content list, and attribute information for the music content to the playback apparatus 30 that made the original request (step S104). The attribute information for the music content includes, for example, the sampling frequency for each track, the channel number, the performance time, the data size, the original codec information, title information (the album name, track names), the artist's name, the label name, the genre of the tracks, content ID and the like. Note that, the original codec information is information that indicates the compression encoding format of the compressed data before it was decoded to decompressed data, and is, for example, MP3, ATRAC or the like.

Next, the playback apparatus 30 displays the content list and/or the attribute information received from the home server 20 on the display portion 332 so that the user can view the content list and/or attribute information. The user then operates the operation portion 330 of the playback apparatus 30 to select the music content that he/she wants to playback (step S106). The selection of the music content may be based on album units or based on track units. In addition, the number of times content is selected may be any chosen number, namely, one, two or more.

Next, the control portion 320 of the playback apparatus 30 activates/deactivates the silence position detection function that detects the silence positions in the intervals between tracks and removes the silent sections as described above (step S108). Switching between activation/deactivation of the silence position detection function may be performed manually based on user selection, or may be performed automatically by the playback apparatus 30 based on the attribute information of the content, the type of the selected content or the like. Hereinafter, an example of the switching method for switching between activation/deactivation of the function will be explained.

For example, if switching is performed manually, and the user wishes to hear a live album without any breaks in sound, the user may operate the operation portion 330 (for example, an ON/OFF button for the silence position detection function) to activate the silence position detection function. In addition, in the case that the user wishes to hear the tracks with a silent section in the intervals between the tracks such as when listening to a normal album in which a plurality of tracks are separated from each other, the user may also operate the operation portion 330 to activate the silence position detection function.

Alternatively, in the case that switching is performed automatically, the playback apparatus 30 uses, for example, the original codec information included in the attribute information received from the home server 20 as a basis for switching between activation/deactivation of the silence position detection function. By referring to the original codec information in the attribute information, it is possible to determine whether the music content stored in the home server 20 that is to be played back is originally decompressed data (for example, linear PCM data) or MP3 compressed data or the like. Note that, in the case that the music content that is to be played back is originally linear PCM data, the playback apparatus 30 deactivates the silence position detection function because it is not necessary to perform the silence position detection because there are fundamentally no silent sections in the intervals between the tracks in the above-described case. On the other hand, if the music content that is to be played back is originally a type of data other than linear PCM data, for example, MP3 compressed data or the like, then there is a possibility that there will be a silent section in the intervals between the tracks, and thus the silence position detection function may be activated.

In addition, the playback apparatus 30 can set the silence position detection function to activate/deactivate for a group unit that includes a plurality of contents, for example, an album unit of music content. For example, information that indicates whether each album is a live album or the like can be pre-set and stored in the playback apparatus 30 for album units, and when playback is performed, the setting information and the album name etc. included in the received attribute information can be used as a basis for determining whether to automatically activate the silence position detection function.

Moreover, the playback apparatus 30 can use, from among the above-described attribute information, the title information (the album name, track names and the like), an identifier that indicates whether the album is a live album or not, etc. as a basis for determining whether the music content that is to be played back is content included in a live album. Based on this, if the music content that is to be played back is content included in a live album or the like, it is necessary to remove the silent sections in the intervals between the tracks before playback, and thus the silence position detection function is activated. On the other hand, in the case that the content is not content included in a live album or the like, there is no problem if silent periods are generated in the intervals between the tracks and thus the silence position detection function is deactivated.

Hereinabove, the switching method for activating/deactivating the silence position detection function at step S108 of FIG. 7 is explained. However, the processing of step S108 may be performed at a different timing or may be omitted.

Next, in the step S110, the playback apparatus 30 sends a transmission request to the home server 20 for the first track of music content (for example, in the case that an album is selected, the first track of the album) from among the one, two or more pieces of music content selected at step S106 (step S110). The transmission request includes specification of the address of the music content of the first track in the home server 20, for example, a URL specification.

The home server 20 receives the transmission request from the playback apparatus 30 and reads the compressed data of the music content of the first track from the specified address of the storage device 230. Then, the decoder 236 is used to decode the compressed data to decompressed data, for example, linear PCM data (step S112), and then streaming transmission to the playback apparatus 30 is started (step S114). In response to this, the playback apparatus 30 sequentially buffers the decompressed data to the detection buffer 344 and the audio buffer 346 while receiving the decompressed data of the first track of the music content. In addition, the D/A converter 350 converts the data to analogue data, and the output is played back (step S116). The streaming transmission and streaming playback performed at steps S112 to S116 are the same as those described in detail with relation to FIG. 6, and thus a detailed explanation will be omitted here.

When streaming transmission of the music content of the first track from the home server 20 is finished, the home server 20 transmits FIN, which is the TCP/IP transmission finished flag, to the playback apparatus 30 as a transmission finished notification for the first track of music content (step S118). As a result of receiving the transmission finished notification (FIN), the playback apparatus 30 is able to determine the timing at which the streaming transmission of the music content of the first track is finished. Accordingly, the playback apparatus 30 is able to accurately identify the end of the decompressed data of the music content of the first track without relying on the inaccurate performance time information etc. included in the attribute information described above.

Note that, the home server 20 and the playback apparatus 30 may use a communication protocol other than TCP/IP, for example, communication may be performed in accordance with UDP/IP or the like. In this case, the transmission finished notification is not specified within the protocol. Accordingly, in this case, if a transmission finished notification for each content unit is transmitted/received between the playback apparatus 30 and the home server 20 in a layer above in the OSI layer model, for example, the application layer, the playback apparatus 30 can determine the timing at which the transmission of each content is finished.

Next, when the playback apparatus 30 receives the transmission finished notification (FIN), the playback apparatus 30 searches back through the sample data of the decompressed data of the first track stored in the detection buffer 344 at the time of receipt, and detects the silence start position as the position at which the sample data value becomes zero (step S120). Once the silence start position has been detected, the control portion 320 of the playback apparatus 30 transfers the sample data of the decompressed data of the first track before the silence start position to the audio buffer 346, where the decompressed data is temporarily stored (step S122). Note that, the sample data (zero data) after the silence start position is not transferred to the audio buffer 346.

Next, the playback apparatus 30 sends a transmission request to the home server 20 for the second track of music content from among the one, two or more pieces of music content selected at step S106 (step S124). The transmission request includes specification of the address of the music content of the second track in the home server 20, for example, a URL specification. In this manner, when transmission of the first track is finished, the playback apparatus 30 requests the home server 20 to transmit the music content for the next track one at a time, namely, in this case requests transmission of the second track.

The home server 20 receives the transmission request for the second track from the playback apparatus 30 and reads the compressed data of the music content of the second track from the specified address of the storage device 230. Then, the decoder 236 is used to decode the compressed data to decompressed data, for example, linear PCM data (step S126), and then streaming transmission to the playback apparatus 30 is started (step S128).

In response to this, the playback apparatus 30 buffers the start section of the decompressed data of the music content of the second track received from the home server 20 to the detection buffer 344 (step S130). In addition, the control portion 320 of the playback apparatus 30 searches the sample data of start frame and after of the decompressed data of the second track stored in the detection buffer 344, and detects the position at which the sample data value becomes a value other than zero as the silence end position (step S132). Once the silence end position has been detected in this manner, the control portion 320 of the playback apparatus 30 transfers the sample data of the decompressed data of the second track after the silence end position to the audio buffer 346, where the decompressed data is temporarily stored (step S134). Following this, the decompressed data of the second track after the silence end position that is stored in the audio buffer 346 is read, converted to analogue data by the D/A converter 350, and the output is played back (step S136).

When streaming transmission of the music content of the second track is finished, the home server 20 transmits the transmission finished notification (FIN) for the music content of the second track to the playback apparatus 30 (step S138). Following this, as at steps S120 and S122 described above, the silence start position at the end of the second track is detected, and just the decompressed data before the silence start position is played back. In addition, after this, the tracks from the third track onward selected at step S106 are continuously played back while silence position detection and the silent section removal are performed by repeatedly performing steps S124 to S138.

As described above, when the silence position detection function is activated, when the playback apparatus 30 receives the transmission finished notification (FIN) for the decompressed data of the kth track from the home server 20, the playback apparatus 30 searches back in the detection buffer 344 to detect the silence start position that is in the end section of the decompressed data of the kth track, and afterwards searches for the silence end position at the start of the (k+1)th track. Then, the playback apparatus 30 transfers, from among the decompressed data stored in the detection buffer 344, the sample data before the silence start position of the decompressed data of the kth track, and the sample data after the silence end position of the decompressed data of the (k+1)th track to the audio buffer 346. The sample data (zero data) of the silent section between the silence start position of the kth track and the silence end position of the (k+1)th track is not transferred to the audio buffer 346. As a result, the decompressed data that is stored in the audio buffer 346 has the silent section between the kth track and the (k+1)th track removed. Accordingly, the decompressed data that is read from the audio buffer 346 can be played back without any silences in the intervals between the tracks. Thus, the playback apparatus 30 can favorably continuously play back the tracks of a live album or the like without any breaks in the sound.

Hereinabove, a detailed explanation is given of the content distribution system 10, the home server 20, the playback apparatus 30 and the content playback method that utilizes these members according to the present embodiment. According to the present embodiment, the decompressed data (for example, linear PCM data) obtained by decoding the compressed data of the content at the home server 20 side is sent by streaming transmission from the home server 20 to the playback apparatus 30, and then played back. In this configuration, in response to receipt of the transmission finished notification for the decompressed data of the kth track, the silent section at the end of the decompressed data of the kth track may be removed, and in addition when receipt of the decompressed data of the following (k+1)th track is started, detection of the silent section at the start of the decompressed data of the (k+1)th track and removal of the silent section may be performed. If this configuration is adopted, even if there are un-required silent sections at the start and end of the compressed data of each track generated at the time of compression by codec, the silent section can be favorably removed and the decompressed data played back. As a result, it is favorably possible to continuously playback a plurality of tracks like those in a live album in which the sound is continuous without generating silent periods in the intervals between the tracks (i.e., without breaks in the sound). Moreover, it is possible to playback a specified one, two or more of the tracks from the plurality of tracks included in the live album or the like without generating breaks in the sound of the tracks.

In particular, when the playback apparatus 30 is connected to a server that does not have a silent section removal function like the home server 20 of the present embodiment, and the playback apparatus 30 plays back the content transmitted from the server, silence position detection and silent section removal can be performed at the playback apparatus 30 side, thereby favorably inhibiting the generation of breaks in the sound.

Furthermore, as a result of performing the silence position detection in response to the transmission finished notification from the home server 20, it is possible to accurately determine the position of the break between the tracks. Accordingly, detection of the silence start position and the silence end position that are at the front and rear of the position of each break can be performed efficiently and accurately.

In addition, the silence position detection function of the playback apparatus 30 can be manually or automatically activated/deactivated. As a result, when the tracks of a live album are played back, the function may be activated to inhibit the generation of breaks in the sound in the intervals between tracks. Alternatively, when the tracks of normal albums other than live albums are played back, the function may be deactivated so that the tracks are separated and not joined together in an unnatural manner. Accordingly, the playback mode may be favorably changed in accordance with the type of content that is to be played back.

It should be understood by those skilled in the art that various modifications, combinations, sub-combinations and alterations may occur depending on design requirements and other factors insofar as they are within the scope of the appended claims or the equivalents thereof.

The above embodiment describes an example in which the content data is distributed from the home server 20 to the playback apparatus 30 via the home network 24. However, the invention is not limited to this structure. For example, the invention may be applied to a system in which content is distributed from a device other than the home server 20 (a user device that does not have a server function or the like) to the playback apparatus 30 via the home network 24. Moreover, the invention may be applied such that content is distributed to the playback apparatus 30 from the server (for example, a content distribution server, another home server owned by a user, or the like) via a public circuit network like the internet, a telephone network, or a satellite communication network. Moreover, the invention may be applied such that, the content is distributed to the server and the playback apparatus via a private network other than a home network, for example, via a LAN, which connects a plurality of devices, used by a group that is limited to a small scale (for example, in a company or amongst friends).

Moreover, the above embodiment describes an example in which the home server 20 decodes the compressed data of the content stored in the home server 20 and transmits the obtained decompressed data to the playback apparatus 30. However, the invention is not limited to this structure, and decompressed data of the content stored in the home server 20 may be transmitted to the playback apparatus 30 unchanged.

In addition, the above embodiment focuses on an example in which a plurality of music contents included in a live album are continuously played back. However, the invention is not limited to this, and, for example, the invention may be favorably applied to continuously playing back a plurality of video contents included in a video program (including image and sound data).

What is claimed is:

1. A playback apparatus comprising:

a communication portion that receives decompressed digital data obtained by decoding compressed digital data that is compression encoded using a specified encoding unit;

a first buffer that temporarily stores the decompressed digital data that is received by the communication portion;

a second buffer that temporarily stores the decompressed digital data that is read from the first buffer;

a D/A conversion portion that performs D/A conversion on the decompressed digital data that is read from the second buffer, and outputs analog data; and a control portion that controls transfer of the decompressed digital data from the first buffer to the second buffer;

wherein, when a transmission finished notification for a kth decompressed digital data is received via the communication portion, the control portion:

detects a silence start position in the kth decompressed digital data that is stored in the first buffer, transfers to the second buffer a section of the kth decompressed digital data that is before the silence start position, temporarily stores (k+1)th decompressed digital data that is received via the communication portion in the first buffer following the transfer of the section of the kth decompressed digital data to the second buffer, detects a silence end position in the (k+1)th decompressed digital data that is stored in the first buffer, and transfers to the second buffer a section of the (k+1)th decompressed digital data that is after the silence end position.

2. The playback apparatus according to claim 1, wherein the communication portion receives the decompressed digital data in accordance with Transmission Control Protocol/Internet Protocol (TCP/IP) and when the control portion receives via the communication portion a control flag, as the transmission finished notification, that indicates that data transmission is finished in TCP/IP, the control portion detects the silence start position in the kth decompressed digital data stored in the first buffer.

3. The playback apparatus according to claim 1, wherein the control portion selectively activates and deactivates a silence position detection function that detects the silence start position and the silence end position.

4. The playback apparatus according to claim 3, wherein
the communication portion receives, prior to receiving the decompressed digital data, attribute information that corresponds with the decompressed digital data, and
the control portion selectively activates and deactivates the silence position detection function that detects the silence start position and the silence end position based on the attribute information.

5. The playback apparatus according to claim 4, wherein the control portion activates the silence position detection function when original codec information included in the attribute information for the decompressed digital data indicates a format other than Pulse Code Modulation (PCM) format.

6. The playback apparatus according to claim 4, wherein the control portion selectively sets the silence position detection function to activate and deactivate for a group unit that includes a plurality of the decompressed digital data based on the attribute information.

7. The playback apparatus according to claim 4, wherein
the decompressed digital data is music data, and
the control portion selectively sets the silence position detection function to activate and deactivate based on title information that is attribute information for the music data.

8. The playback apparatus according to claim 1, wherein
the first buffer is capable of storing at least one unit of the specified encoding unit of decompressed digital data, and
in response to receipt of the transmission finished notification, the control portion searches sample data included in an end section of the kth decompressed digital data that is already stored in the first buffer at the time of receiving the transmission finished notification, and detects the silence start position.

9. The playback apparatus according to claim 1, wherein
the first buffer is capable of storing at least one unit of the specified encoding unit of decompressed digital data, and
when the control portion starts to receive the (k+1)th decompressed digital data, the control portion searches sample data included in a start section of the (k+1)th decompressed digital data that is stored in the first buffer, and detects the silence end position.

10. A playback method including receiving decompressed digital data obtained by decoding compressed digital data that is compression encoded using a specified encoding unit, temporarily storing the received decompressed digital data in a first buffer, temporarily storing the decompressed digital data that is read from the first buffer in a second buffer, converting the decompressed digital data that is read from the second buffer to analog data using a digital to analog (D/A) conversion portion, and outputting the data, the playback method comprising the steps of:
receiving a transmission finished notification for a kth decompressed digital data;
detecting a silence start position in the kth decompressed digital data that is stored in the first buffer when the transmission finished notification is received;
transferring to the second buffer a section of the kth decompressed digital data that is before the silence start position;
receiving (k+1)th decompressed digital data after transferring the section of the kth decompressed digital data;
temporarily storing in the first buffer the (k+1)th decompressed digital data;
detecting a silence end position in the (k+1)th decompressed digital data that is stored in the first buffer; and
transferring to the second buffer a section of the (k+1)th decompressed digital data that is after the silence end position.

11. The playback method according to claim 10, wherein
in the transmission finished notification receiving step, a control flag that indicates that data transmission is finished in Transmission Control Protocol/Internet Protocol (TCP/IP) is received as the transmission finished notification, and
in the silence start position detection step, when the control flag (RN) is received, the silence start position in the kth decompressed digital data stored in the first buffer is detected.

12. The playback method according to claim 10, further comprising the step of:
selectively activating and deactivating a silence position detection function that detects the silence start position and the silence end position.

13. The playback method according to claim 12, further comprising the step of:
receiving, prior to receiving the decompressed digital data, attribute information that corresponds with the decompressed digital data, wherein
in the selective activation/deactivation step, the silence position detection function is selectively activated and deactivated based on the attribute information.

14. The playback method according to claim 13, wherein in the selective activation/deactivation step, the silence position detection function is activated when original codec information included in the attribute information for the decompressed digital data indicates a format other than Pulse Code Modulation (PCM) format.

15. The playback apparatus according to claim 13, wherein in the selective activation/deactivation step, the silence position detection function is selectively set to activate and deactivate for a group unit that includes a plurality of the decompressed digital data based on the attribute information.

16. The playback apparatus according to claim 13, wherein
the decompressed digital data is music data, and
in the selective activation/deactivation step, the silence position detection function is selectively set to activate and deactivate based on title information that is attribute information for the music data.

17. The playback apparatus according to claim 10, wherein
the first buffer is capable of storing at least one unit of the specified encoding unit of decompressed digital data, and
in the silence start position detection step, in response to receipt of the transmission finished notification, sample data included in an end section of the kth decompressed digital data that is already stored in the first buffer at the time of receiving the transmission finished notification is searched, and the silence start position is detected.

18. The playback method according to claim 10, wherein
the first buffer is capable of storing at least one unit of the specified encoding unit of the decompressed digital data, and
in the silence end position detection step, in response to receipt of the (k+1)th decompressed digital data, sample data included in a start section of the (k+1)th decompressed digital data that is stored in the first buffer is searched, and the silence end position is detected.

19. A non-transitory recording medium on which a program is recorded, the program including instructions that command a computer to execute the steps of receiving decompressed digital data obtained by decoding compressed digital data that is compression encoded using a specified encoding unit, temporarily storing the decompressed digital data in a first buffer, reading the decompressed digital data from the first buffer, temporarily storing the decompressed digital data in a second buffer, converting the decompressed digital data to analog data using a digital to analog (D/A) conversion portion, and outputting the data, the recorded program comprising instructions that command the computer to execute the steps of:

receiving a transmission finished notification for a kth decompressed digital data;

detecting a silence start position in the kth decompressed digital data that is stored in the first buffer when the transmission finished notification is received, transferring to the second buffer a section of the kth decompressed digital data that is before the silence start position, receiving (k+1)th decompressed digital data after transferring the section of the kth decompressed digital data;

temporarily storing in the first buffer the (k+1)th decompressed digital data;

detecting a silence end position in the (k+1)th decompressed digital data that is stored in the first buffer, and transferring to the second buffer a section of the (k+1)th decompressed digital data that is after the silence end position.

20. The non-transitory recording medium according to claim 19, wherein the recorded program comprises instructions that command the computer to execute the steps of:

receiving a control flag (FIN), as the transmission finished notification, that indicates that data transmission is finished in TCP/IP in the transmission finished notification receiving step, and when the control flag (FIN) is received, detecting the silence start position in the kth decompressed digital data stored in the first buffer in the silence start position detection step.

21. The non-transitory recording medium according to claim 19, wherein the recorded program comprises instructions that command the computer to execute the step of: selectively activating and deactivating a silence position detection function that detects the silence start position and the silence end position.

22. The non-transitory recording medium according to claim 19, wherein the recorded program comprises instructions that command the computer to execute the step of:

receiving, prior to receiving the decompressed digital data, attribute information that corresponds with the decompressed digital data, wherein in the selective activation/deactivation step, the silence position detection function is selectively activated and deactivated based on the attribute information.

23. The non-transitory recording medium according to claim 19, wherein in the selective activation/deactivation step, the silence position detection function is activated when original codec information included in the is attribute information for the decompressed digital data indicates a format other than PCM format.

24. The non-transitory recording medium according to claim 19, wherein in the selective activation/deactivation step, the silence position detection function is selectively set to activated and deactivated for a group unit that includes a plurality of the decompressed digital data based on the attribute information.

25. The non-transitory recording medium according to claim 19, wherein the decompressed digital data is music data, and in the selective activation/deactivation step, the silence position detection function is selectively activated and deactivated based on title information that is attribute information for the music data.

26. The non-transitory recording medium according to claim 19, wherein the first buffer is capable of storing at least one unit of the specified encoding unit of decompressed digital data, and in the silence start position detection step, in response to receipt of the transmission finished notification, sample data included in an end section of the kth decompressed digital data that is already stored in the first buffer at the time of receiving the transmission finished notification is searched, and the silence start position is detected.

27. The non-transitory recording medium according to claim 19, wherein the first buffer is capable of storing at least one unit of the specified encoding unit of the decompressed digital data, and in the silence end position detection step, in response to receipt of the (k+1)th decompressed digital data, sample data included in a start section of the (k+1)th decompressed digital data that is stored in is the first buffer is searched, and the silence end position is detected.

28. A playback system comprising:

a server that includes a decoder to decode decompressed digital data that is compression encoded using a specified encoding unit, and a server communication portion to transmit decompressed digital data obtained by the decoder; and a playback apparatus including a client communication portion to receive the decompressed digital data;

a first buffer to temporarily store the decompressed digital data received by the client communication portion;

a second buffer to temporarily store the decompressed digital data read from the first buffer;

a digital to analog (D/A) conversion portion to perform D/A conversion on the decompressed digital data read from the second buffer, and outputs analog data; and a control portion to control transmission of the decompressed digital data from the first buffer to the second buffer, wherein, when a transmission finished notification for kth decompressed digital data is received via the client communication portion, the control portion detects a silence start position in the kth decompressed digital data that is stored in the first buffer, transfers to the second buffer a section of the kth decompressed digital data that is before the silence start position, requests transmission of (k+1)th decompressed digital data from the server following transfer of the section of the kth decompressed digital data, temporarily stores in the first buffer the (k+1)th decompressed digital data that is received via the client communication portion, detects a silence end position in the (k+1)th decompressed digital data that is stored in the first buffer, and transfers to the second buffer a section of the (k+1)th decompressed digital data that is after the silence end position.

29. The playback system according to claim 28, wherein the server communication portion transmits to the playback apparatus a control flag, as the transmission finished notification, that indicates that data transmission is finished in Transmission Control Protocol/Internet Protocol (TCP/IP), and when the client communication portion receives the control flag, the control portion detects the silence start position in the kth decompressed digital data stored in the first buffer.

30. The playback system according to claim 28, wherein the server communication portion transmits attribute information for the decompressed digital data to the client communication portion, and the control portion selectively activates and deactivates the silence position detection function that detects the silence start position and the silence end position based on the attribute information.

* * * * *